(12) United States Patent
Marsden et al.

(10) Patent No.: US 8,056,972 B2
(45) Date of Patent: Nov. 15, 2011

(54) ENERGY-DISSIPATION SYSTEM (75) Inventors: Andrew W Marsden, Hingham, MA (US); Ward Fritz, Chelsea, MA (US); Walter S Bezaniuk, Berkley, MA (US); Langley Joe, Foxboro, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 170 days.

(21) Appl. No.: 12/469,487

(22) Filed: May 20, 2009

(65) Prior Publication Data
US 2010/0295344 A1 Nov. 25, 2010

(51) Int. Cl.
*B60N 2/42* (2006.01)
(52) U.S. Cl. .................. 297/216.11; 297/216.1
(58) Field of Classification Search ............... 297/216.1, 297/216.11; 280/739, 729, 728.1, 730.1; 180/271, 274
See application file for complete search history.

(56) References Cited

U.S. PATENT DOCUMENTS

| | | | |
|---|---|---|---|
| 4,213,202 A * | 7/1980 | Larry | 2/456 |
| 4,534,068 A * | 8/1985 | Mitchell et al. | 2/414 |
| 4,642,814 A * | 2/1987 | Godfrey | 2/462 |
| 4,883,299 A * | 11/1989 | Bonar | 293/110 |
| 4,899,961 A | 2/1990 | Herndon | |
| 4,919,483 A | 4/1990 | Horkey | |
| 5,235,715 A | 8/1993 | Donzis | |
| 5,292,175 A | 3/1994 | Artz | |
| 5,292,176 A | 3/1994 | Artz | |
| 5,335,968 A | 8/1994 | Sheridan et al. | |
| 5,567,015 A | 10/1996 | Arias | |
| 5,881,395 A | 3/1999 | Donzis | |
| 6,485,101 B2 | 11/2002 | Kassai et al. | |
| 6,519,780 B2 | 2/2003 | Goodwin | |
| 7,125,073 B2 | 10/2006 | Yoshida | |
| 7,232,182 B2 | 6/2007 | Yoshida | |
| 7,234,771 B2 | 6/2007 | Nakhla | |
| 7,246,853 B2 | 7/2007 | Harcourt et al. | |
| 7,293,828 B2 * | 11/2007 | Yoshida | 297/216.11 |
| 7,654,613 B2 | 2/2010 | Bass | |
| 7,717,506 B2 | 5/2010 | Amesar et al. | |
| 7,726,734 B2 | 6/2010 | Mahal et al. | |
| 7,744,154 B2 | 6/2010 | Marsden et al. | |
| 7,748,781 B2 | 7/2010 | Bass | |
| 7,774,866 B2 * | 8/2010 | Ferrara | 2/455 |
| 2001/0043001 A1 | 11/2001 | Kassai et al. | |
| 2002/0153753 A1 | 10/2002 | Kassai | |

(Continued)

FOREIGN PATENT DOCUMENTS

EP 0928718 7/1999

(Continued)

OTHER PUBLICATIONS

International Preliminary Report on Patentability (Ch. II) issued in connection with PCT/US2008/087382 and completed by the US Examining Authority on Oct. 9, 2010.

(Continued)

*Primary Examiner* — Sarah B McPartlin
(74) *Attorney, Agent, or Firm* — Barnes & Thornburg LLP (57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

26 Claims, 7 Drawing Sheets

| U.S. PATENT DOCUMENTS | | | |
|---|---|---|---|
| 2007/0085394 A1 | 4/2007 | Yang | |
| 2007/0252418 A1 | 11/2007 | Harcourt et al. | |
| 2008/0258518 A1 | 10/2008 | Jane Santamaria | |
| 2009/0066125 A1* | 3/2009 | Nett et al. | 297/216.11 |
| 2009/0152913 A1 | 6/2009 | Amesar et al. | |
| 2009/0179469 A1 | 7/2009 | Bass | |
| 2009/0179470 A1 | 7/2009 | Bass | |
| 2009/0256404 A1 | 10/2009 | Strong et al. | |
| 2010/0019554 A1 | 1/2010 | Mahal et al. | |
| 2010/0026064 A1 | 2/2010 | Marsden et al. | |
| 2010/0134470 A1 | 6/2010 | Bu et al. | |
| 2010/0194158 A1* | 8/2010 | Mahal et al. | 297/216.11 |

| FOREIGN PATENT DOCUMENTS | | |
|---|---|---|
| EP | 1167114 | 1/2002 |
| WO | 2009076514 | 6/2009 |

OTHER PUBLICATIONS

European Search Report dated Aug. 31, 2010, for related European Application No. EP 10163494.

International Search Report dated Feb. 13, 2009, for International Application No. PCT/US2008/087382.

* cited by examiner

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad coupled to a headrest included in a juvenile vehicle seat. The ride-down pad includes one or more air bags. In illustrative embodiments, a ride-down pad includes an inner shell coupled to a juvenile vehicle seat and an outer shell coupled either to the inner shell or to the juvenile vehicle seat. The inner shell and the juvenile vehicle seat cooperate to form a first air bag. The outer and inner shells cooperate to form the second air bag.

When the juvenile vehicle seat is exposed to an external impact force, the air bags defined by the outer and inner shells are exposed to such a force and deformed. The normally inflated air bag(s) deflate to cause the ride-down pad to absorb external energy associated with the external impact force to minimize g-loads experienced by a child seated on the juvenile vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child-restraint system including a juvenile vehicle seat having a seat bottom and a seat back extending upwardly from the seat bottom and an energy-dissipation system coupled to the seat back and made in accordance with a first embodiment of the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad;

FIG. 4 is an enlarged sectional view taken along line 4-4 of FIG. 1 showing placement of the right-side ride-down pad on an inner wall of a first side-wing panel of the headrest and showing that (1) the brim of the inner shell mates with the inner wall of the first side-wing panel to form a first air bag having a first air chamber to expose air extant in the first air chamber to the first and second air-discharge ports formed in the inner shell and (2) the brim of the outer shell mates with the inner shell to form a second air bag having a second air chamber between the outer and inner shells to expose air extant in the second air chamber to the first and second air-discharge ports formed in the outer shell and to align the first and second air-transfer ports formed in the outer shell with, respectively, the first and second air-discharge ports formed in the inner shell while a portion of the inner shell is arranged to lie in the interior region of the outer shell;

FIG. 5 is a sectional view similar to FIG. 4 showing deformation and partial deflation of each of the first and second air bags in the right-side ride-down pad following sudden application of an external impact force to the first side-wing panel of the headrest to deform the outer and inner shells and showing that air is discharged from (1) the first air chamber in the first air bag through an air-exhaust passageway defined by each air-discharge port formed in the inner shell, a companion air-transfer passageway formed in the outer shell, and space provided in the second air chamber between the companion ports and (2) the second air chamber in the second air bag through each air-discharge port formed in the outer shell when the outer and inner shells are deformed and squeezed between a seated child and the external impact force to minimize the magnitude of a resulting force applied to a child seated in a juvenile vehicle seat including the right-side ride-down pad and thereby to minimize the g-load (acceleration) caused by the resulting force and experienced by the seated child;

FIG. 6 is a perspective view of a child-restraint system including a juvenile vehicle seat having a seat bottom and a seat back extending upwardly from the seat bottom and an energy-dissipation system coupled to the seat back and made in accordance with a second embodiment of the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad;

FIG. 10 is a sectional view similar to FIG. 9 showing deformation and partial deflation of each of the first and second air bags in the right-side ride-down pad following sudden application of an external impact force to the first side-wing panel of the headrest to deform the outer and inner shells and showing that air is discharged through the air-discharge ports formed in the inner shell from (1) the first air chamber in the first air bag into the second air chamber in the second air bag and (2) from the second air chamber in the second air bag to the surroundings outside of the right-side ride-down pad through the air-discharge ports formed in the outer shell when the outer and inner shells are deformed and squeezed between a seated child and the external impact force to minimize the magnitude of a resulting force applied to a child seated in a juvenile vehicle seat including the right-side ride-down pad and thereby to minimize the g-load (acceleration) caused by the resulting force and experienced by the seated child.

DETAILED DESCRIPTION

Figures 1, 2:
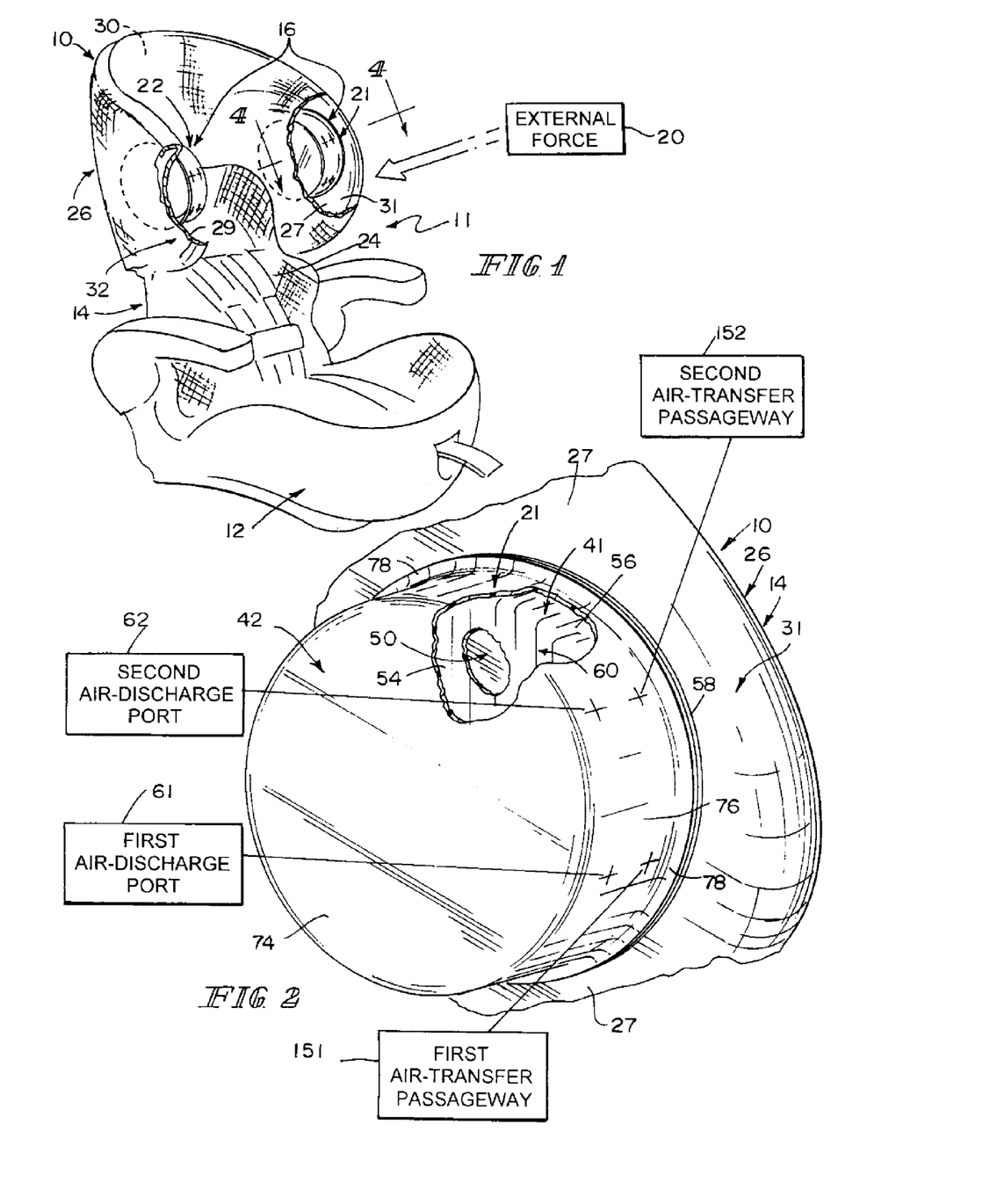
FIG. 2 is an enlarged perspective view of the right-side ride-down pad mounted on the first side-wing panel of the headrest shown in FIG. 1, with portions broken away.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16. Another illustrative child-restraint system 111 includes an energy-dissipation system 116 coupled to a seat back 14 of a juvenile vehicle seat 10 as suggested in FIG. 6. It is within the scope of this disclosure to mount energy-dissipation systems 16 or 116 on a juvenile seat or other device to dissipate energy transferred to such a seat or device by means of an external impact force applied to the seat or device.

Each energy-dissipation system 16, 116 comprises a ride-down pad that is designed to minimize the g-loads experienced by a child seated on seat bottom 12 of juvenile vehicle seat 10 during exposure of seat 10 to an external impact force. Ride-down pads 21, 22 in accordance with a first embodiment of the present disclosure are shown, for example, in FIGS. 1-5. A variation of this first embodiment is shown in FIG. 4A. Ride-down pads 121, 122 in accordance with a second embodiment of the present disclosure are shown, for example, in FIGS. 6-10. A variation of this second embodiment is shown in FIG. 9A. Reference is hereby made to U.S. application Ser. No. 12/327,376 filed Dec. 4, 2008, the entirety of which is hereby incorporated by reference herein, for disclosures of various ride-down pad configurations and mounting arrangements.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as shown in FIGS. 1, 2, 9, and 10. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

Figure 5:
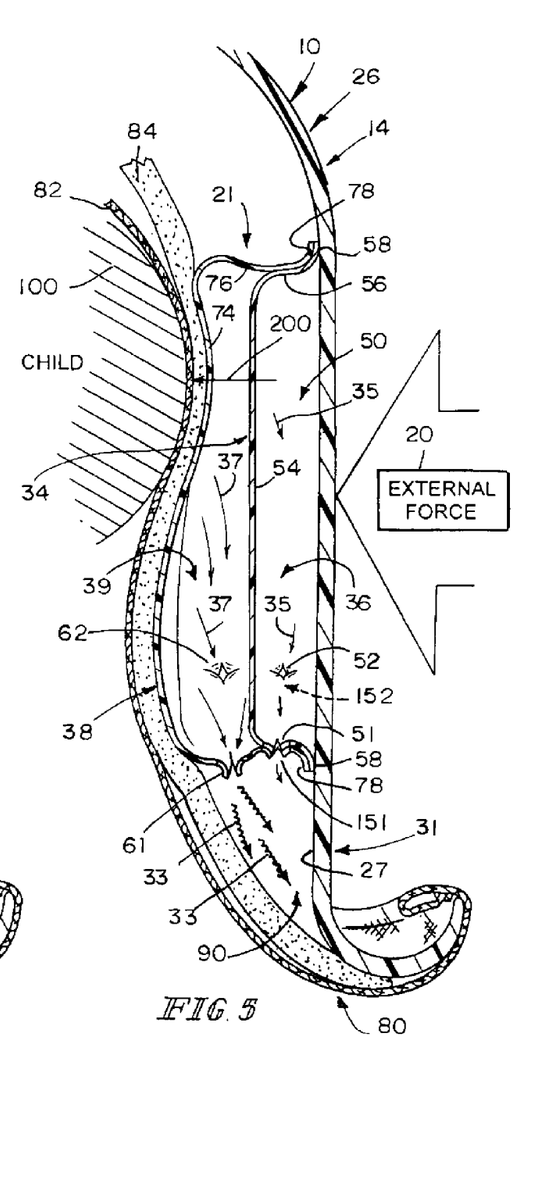

During a collision or other incident, application of an external impact force 20 to right-side ride-down pad 21 causes energy to be transferred from an impacting object (not shown) to right-side ride-down pad 21 as suggested in FIGS. 1 and 5. Ride-down pad 21 absorbs that transferred energy as suggested in FIG. 5 to minimize the magnitude of a resulting force 200 applied to a child 100 seated in juvenile vehicle seat 10 during the collision. Ride-down pad 21 functions to minimize the g-loads (acceleration) experienced by child 100 seated on seat bottom 12 of juvenile vehicle seat 10 during exposure of seat 10 to external impact force 20 as suggested in FIG. 5. Ride-down pad 21 also functions to maximize the time interval (i.e., ride-down time) between the moment the impacting object strikes ride-down pad 21 to apply the external impact force 20 and the moment that resulting force 200 reaches zero. Each of ride-down pads 22, 121, and 122 functions in a manner similar to ride-down pad 21.

Figure 3:
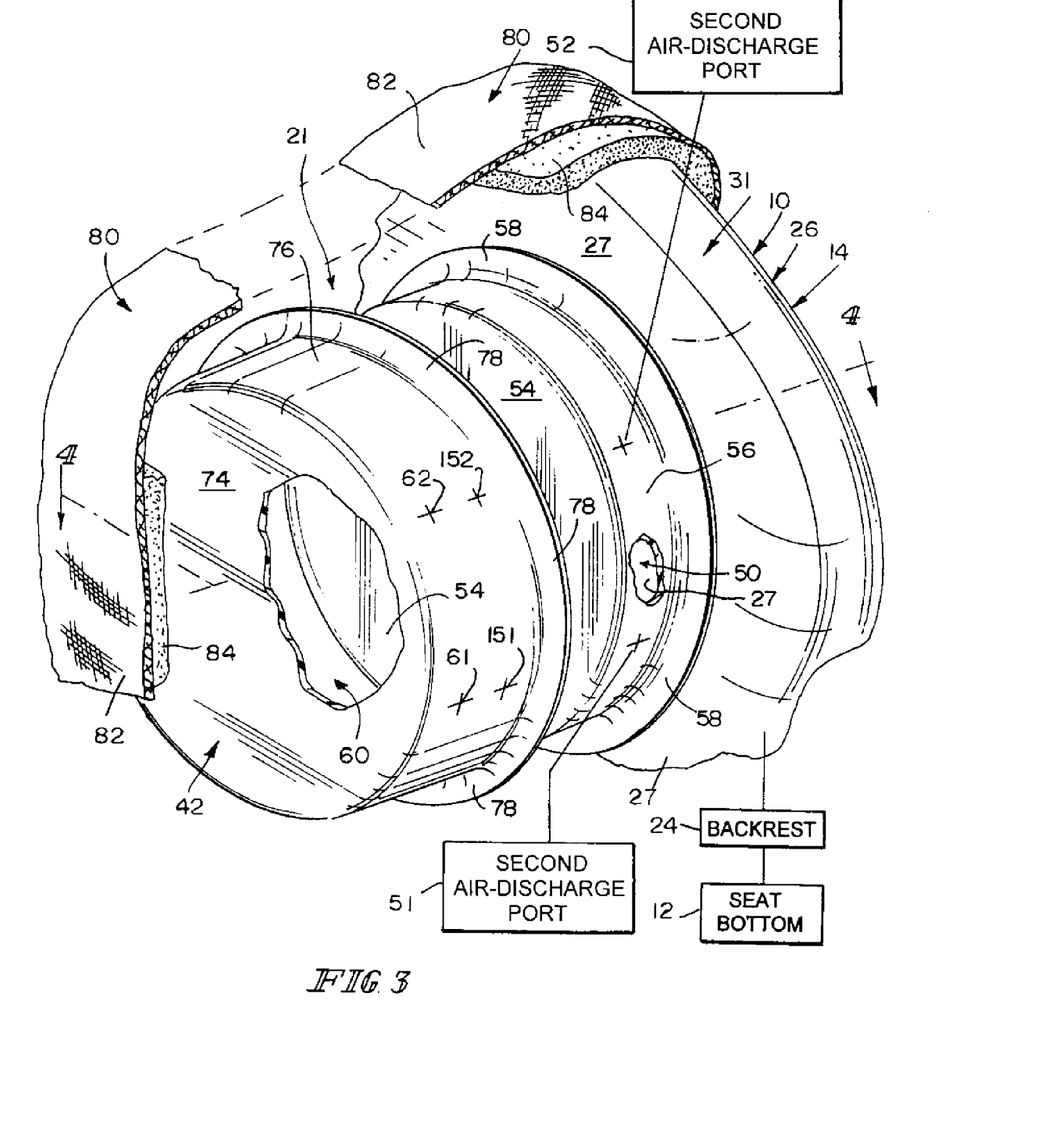
FIG. 3 is an exploded perspective assembly view of the right-side ride-down pad of FIG. 2 showing that the ride-down pad is a multi-stage unit comprising (1) an outer shell formed to include an interior region and forwardly facing first and second air-discharge ports (e.g., cross-shaped slits) opening into the interior region of the outer shell and forwardly facing first and second air-transfer ports (e.g., cross-shaped slits lying near a brim of the outer shell and opening into the interior region of the outer shell and (2) an inner shell formed to include an interior region and forwardly facing first and second air-discharge ports (e.g., cross-shaped slits) lying near a brim of the inner shell and opening into the interior region of the inner shell.
Figure 4:
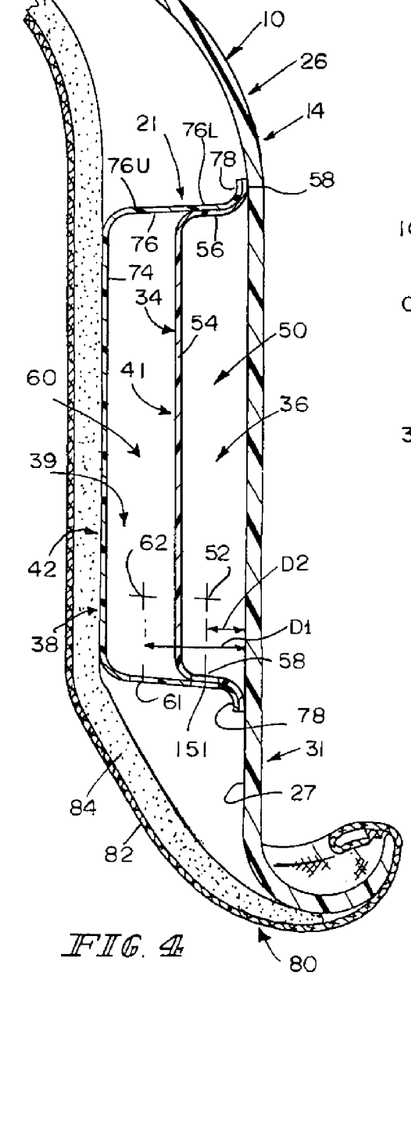
FIG. 4A is a sectional view similar to FIG. 4 of another illustrative embodiment wherein each of the outer and inner shells is mounted on the juvenile vehicle seat to form the right-side ride-down pad.
Figure 4A:
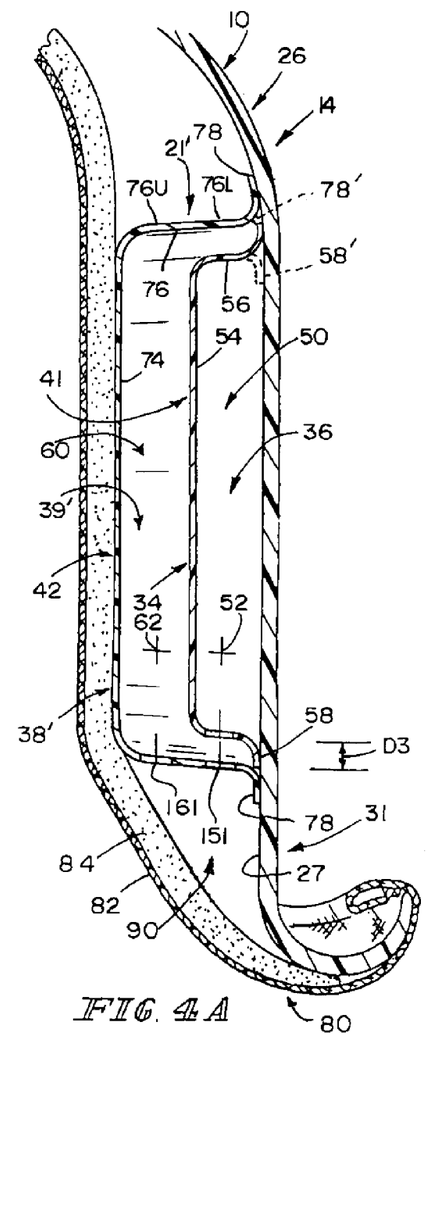

Right-side ride-down pad 21 includes an inner shell 41 and an outer shell 42 as suggested in FIGS. 2-4. Each of shells 41, 42 is formed normally to assume a predetermined inflated shape as shown best in FIG. 4. In illustrative embodiments, each of shells 41, 42 is made of any suitable deformable elastic plastics material including, but not limited to, thermal plastic elastomers. Each of shells 41, 42 is configured to remain in the predetermined inflated shape until a sufficient external impact force 20 is applied to juvenile vehicle seat 10 to cause deformation of inner and outer shells 41, 42 as suggested in FIG. 5. Left-side ride-down pad 22 is similar in construction to right-side ride-down pad 21.

Inner shell 41 is formed to include an interior region 50 and normally closed first and second air-discharge ports 51, 52 (e.g., cross-shaped slits) opening into interior region 50 as suggested in FIGS. 3-5. In an illustrative embodiment, inner shell 41 includes a top wall 54 and a side wall 56 coupled to a perimeter edge of top wall 54 to form interior region 50. Side wall 56 has an annular shape and is formed to include first and second air-discharge ports 51, 52. Top wall 54 has a round shape in an illustrative embodiment and cooperates with annular side wall 56 to provide a bowl-shaped inner shell 41. In an illustrative embodiment, side wall 56 of inner shell 41 includes an outturned annular brim 58 that is adapted to mate with juvenile vehicle seat 10 when inner shell 41 is mounted don juvenile vehicle seat 10.

Outer shell 42 is formed to include an interior region 60, normally closed first and second air-discharge ports 61, 62 (e.g., cross-shaped slits) opening into interior region 60, and normally closed air-transfer passageways 151, 152 (e.g., cross-shaped slits) opening into interior region 60 as suggested in FIGS. 3-5. In an illustrative embodiment, outer shell 42 includes a top wall 74 and a side wall 76 coupled to a perimeter edge of top wall 74 to form interior region 60. Side wall 76 has an annular shape and is formed to include ports 61, 62 and passageways 151, 152. Top wall 74 has a round shape in an illustrative embodiment and cooperates with annular side wall 76 to provide a bowl-shaped outer shell 42. In an illustrative embodiment, side wall 76 of outer shell 42 includes an outturned annular brim 78 that is adapted to lie in spaced-apart relation to juvenile vehicle seat 10 to trap annular brim 58 of inner shell 41 there between when outer shell 42 is associated with companion inner shell 41 to form right-side ride-down pad 21 as suggested in FIGS. 4 and 5.

As suggested in FIG. 4, each of first and second air-discharge ports 61, 62 lies at a distance D1 from inner wall 27 of juvenile vehicle seat 10 when outer shell 42 is associated with companion inner shell 41 to establish right-side ride-down pad 21. As also suggested in FIG. 4, each of first and second air-discharge ports 51, 52 formed in inner shell 41 and each of first and second air-transfer passageways 151, 152 formed in outer shell 42 lies at a distance D2 from inner wall 27 of juvenile seat 10 when outer shell 42 is associated with companion inner shell 41 to establish right-side ride-down pad 21. Distance D1 is greater than distance D2 in an illustrative embodiment.

As suggested in FIG. 4, inner shell 41 is coupled to juvenile vehicle seat 10 to form a first air bag 34 having a first air chamber 36. Air 35 extant in first air chamber 36 is exposed to first and second air-discharge ports 51, 52 formed in inner shell 41 as suggested in FIGS. 4 and 5. In an illustrative embodiment, annular brim 58 is mated with an inner wall 27 of juvenile vehicle seat 10 to establish a fluid-tight seal therebetween as suggested in FIG. 4. In the illustrated embodiment, inner wall 27 is included in first side-wing panel 31 of headrest 26 of seat back 12 of juvenile vehicle seat 10 as suggested in FIGS. 1 and 4.

As also suggested in FIG. 4, outer shell 42 is coupled to inner shell 41 to form a second air bag 38 having a second air chamber 39. Second air chamber 39 is bounded at least in part by outer and inner shells 42, 41 and arranged to expose air 37 extant in second air chamber 39 to first and second air-discharge ports 61, 62 formed in outer shell 42 as suggested in FIGS. 4 and 5. In an illustrative embodiment, annular brim 78 of outer shell 42 is mated to annular brim 58 of inner shell 41 to establish a fluid-tight seal therebetween as suggested in FIG. 4. It is within the scope of the present disclosure to turn both of mating brims 58, 78 inwardly to lie in interior region 50 and cause annular brim 78 to mate with inner wall 27 of juvenile vehicle seat 10.

In an alternate embodiment, annular brim 78 of outer shell 42 is arranged to surround annular brim 58 of inner shell 41 and is mated with inner wall 27 of juvenile vehicle seat 10 to establish a fluid-tight seal therebetween as suggested in FIG. 4A. This creates a second air bag 38' having a second air chamber 39' as suggested in FIG. 4A. In this alternate embodiment, inner and outer shells 41, 42 cooperate to form a first ride-down pad 21' as suggested in FIG. 4A. In the illustrated embodiment, annular brim 58 is arranged to lie outside of and extend away from interior region 50. It is within the scope of the present disclosure to provide an in-turned annular brim 58' located in interior region 50 as suggested in phantom in FIG. 4A. In the illustrated embodiment, annular brim 78 is arranged to lie outside of and extend away from interior region 60. It is within the scope of the present disclosure to provide an in-turned annular brim 78' located in interior region 60 as suggested in phantom in FIG. 4A.

As suggested in FIG. 4, first and second air chambers 36, 39 are filled with air to allow each of inner and outer shells 41, 42 normally to assume a predetermined inflate shape. In an illustrative embodiment, each of inner and outer shells 41, 42 is made of a deformable elastic material to assume the predetermined inflated shapes shown in FIGS. 1-4. Alternate predetermined inflated shapes are shown in FIG. 4A.

As suggested in FIG. 5, each of first and second air-discharge ports 51, 52 formed in inner shell 41 is formed to include means for discharging air 35 from first air chamber 36 (at least temporarily or briefly) into second air chamber 39 at a metered rate when inner shell 41 is exposed to an external impact force associated with external impact force 20 to cause inner shell 41 to change from the predetermined inflated shape shown, for example, in FIG. 4 to a deflated shape shown, for example, in FIG. 5. As suggested in FIGS. 4 and 5, side wall 76 of outer shell 42 mates with side wall 56 of inner shell 41.

In an illustrative embodiment shown in FIG. 5, first air-transfer passageway 151 formed in outer shell 42 is aligned in closely confronting relation to companion first air-discharge port 51 formed in inner shell 41 to establish first air-exhaust means for conducting air 35 discharged from first air chamber 36 to surroundings 90 outside of first ride-down pad 21. Similarly, a second air-transfer passageway 152 formed in outer shell 42 is aligned in closely confronting relation to companion second air-discharge port 52 to establish second air-exhaust means for conducting air 35 discharged from first air chamber 36 to surroundings 90 outside of first ride-down pad 21. Once discharged to surroundings 90, air 35 merges with air 37 to form discharged air 33 as suggested in FIG. 5.

In the alternate embodiment shown in FIG. 4A, companion first air-discharge port 51 and first air-transfer port 151 are separated by a distance D3 but still aligned in confronting relation to one another. Similarly, companion second air-discharge port 52 and second air-transfer port 152 are separated by distance D3 but still aligned in confronting relation to one another. As suggested in FIG. 4A, each of side walls 56, 76 has an annular shape and a lower portion 76L of side wall 76 of outer shell 42 is arranged to surround and lie in spaced-apart relation to side wall 56 of inner shell 41 to define an annular space lying therebetween and comprising a portion of second air chamber 39'.

In illustrative embodiments, top walls 54, 74 of inner and outer shells 41, 42 are arranged to lie in spaced-apart relation to one another when inner and outer shells 41, 42 assume their predetermined inflated shapes to form at least a portion of second air chamber 39 or 39' therebetween as suggested in FIGS. 4 and 4A. As suggested in the embodiments shown in FIGS. 4 and 4A, side wall 76 of outer shell 42 includes an upper portion 76U coupled to top wall 74 and a lower portion 76L configured to include annular brim 78. Upper portion 76U is formed to include first and second air-discharge ports 61, 62. Lower portion 76L is arranged to extend from upper portion 76U toward inner wall 27 of juvenile vehicle seat 10 and to surround side wall 56 of inner shell 41. Lower portion 76L is formed to include first and second air-transfer passageways 71, 72.

In an illustrative embodiment, an outer cover 80 is coupled to headrest 26 and arranged to cover each of right-side and left-side ride-down pads 21, 22. Outer cover 80 functions to dissipate energy associated with external impact forces 20 and to protect ride-down pads 21, 22 from damage. In an illustrative embodiment, outer cover 80 includes an outer skin 82 and a cushion 84 under outer skin 82 as shown, for example, in FIGS. 3-5.

Figures 6, 7:
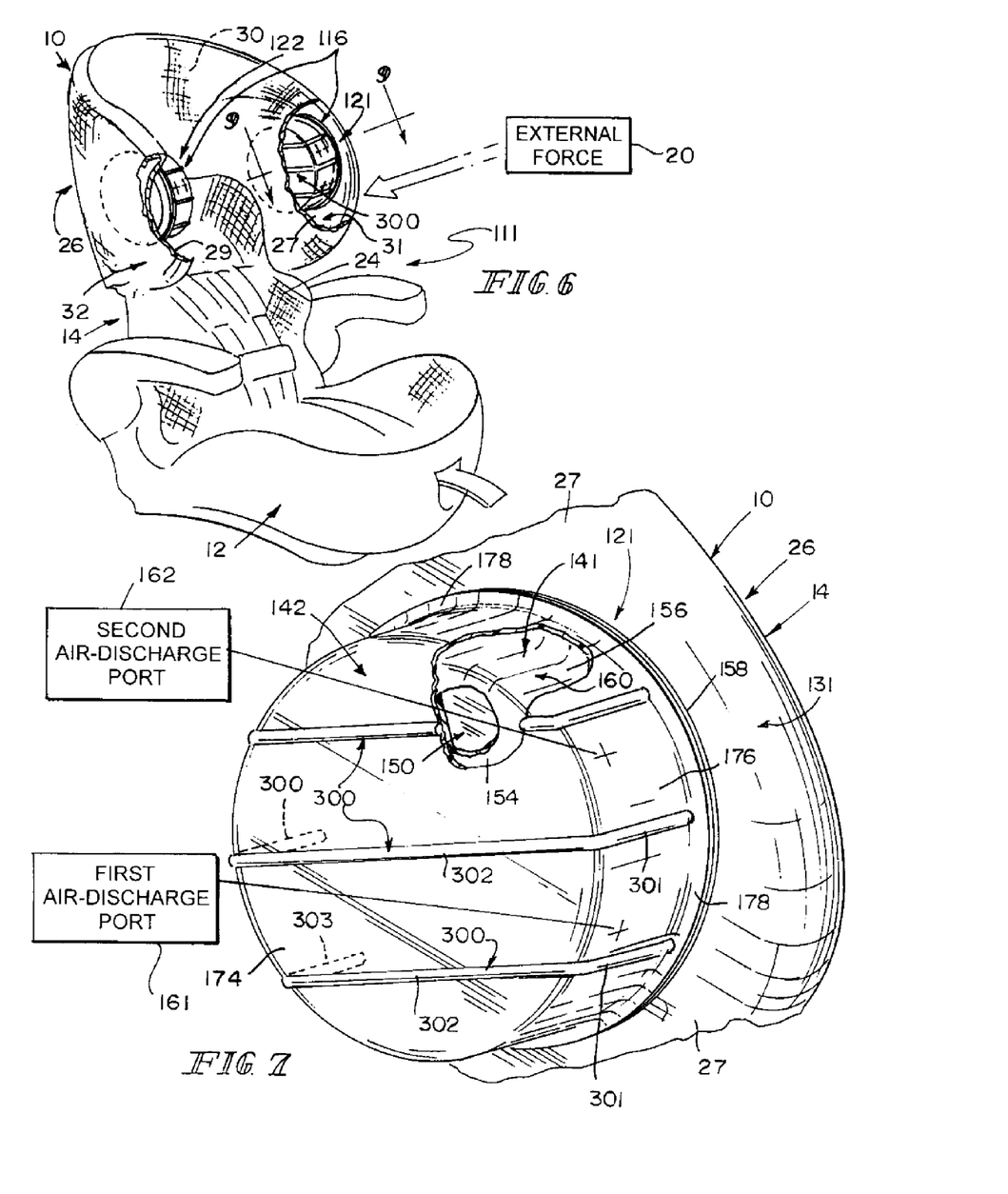
FIG. 7 is an enlarged perspective view of the right-side ride-down pad mounted on the first side-wing panel of the headrest shown in FIG. 6, with portions broken away.

In a second embodiment of the present disclosure, a child restraint 111 includes right-side and left-side ride-down pads 121, 122 as shown in FIG. 6. In this second embodiment, right-side ride-down pad 121 includes inner shell 141 and outer shell 142 as suggested in FIGS. 7-10. Left-side ride-down pad 122 is similar in construction to right-side ride-down pad 121.

Figure 9:
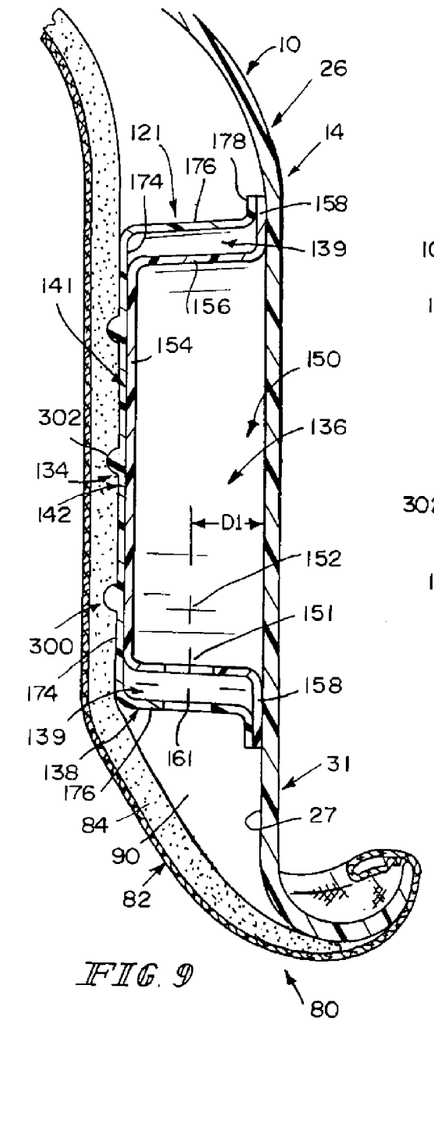
FIG. 9 is an enlarged sectional view taken along line 9-9 of FIG. 6 showing placement of the right-side ride-down pad on an inner wall of a first side-wing panel of the headrest and showing that (1) a brim of the inner shell mates with the inner wall of the first side-wing panel to form a first air bag having a first air chamber to expose air extant in the first air chamber to the first and second air-discharge ports formed in the inner shell and (2) a brim of the outer shell mates with the inner shell to form a second air bag having a second air chamber between the outer and inner shells to expose air extant in the second air chamber to the first and second air-discharge ports formed in the outer shell.

Each of shells 141, 142 is formed normally to assume a predetermined inflated shape as shown best in FIG. 9. In illustrative embodiments, each of shells 141, 142 is made of any suitable deformable elastic plastics material including, but not limited to, thermal plastic elastomers. Each of shells 141, 142 is configured to remain in the predetermined inflated shape until a sufficient external impact force 20 is applied to juvenile vehicle seat 10 to cause deformation of inner and outer shells 141, 142 as suggested in FIG. 10. Left-side ride-down pad 22 is similar in construction to right-side ride-down pad 21.

Figure 8:
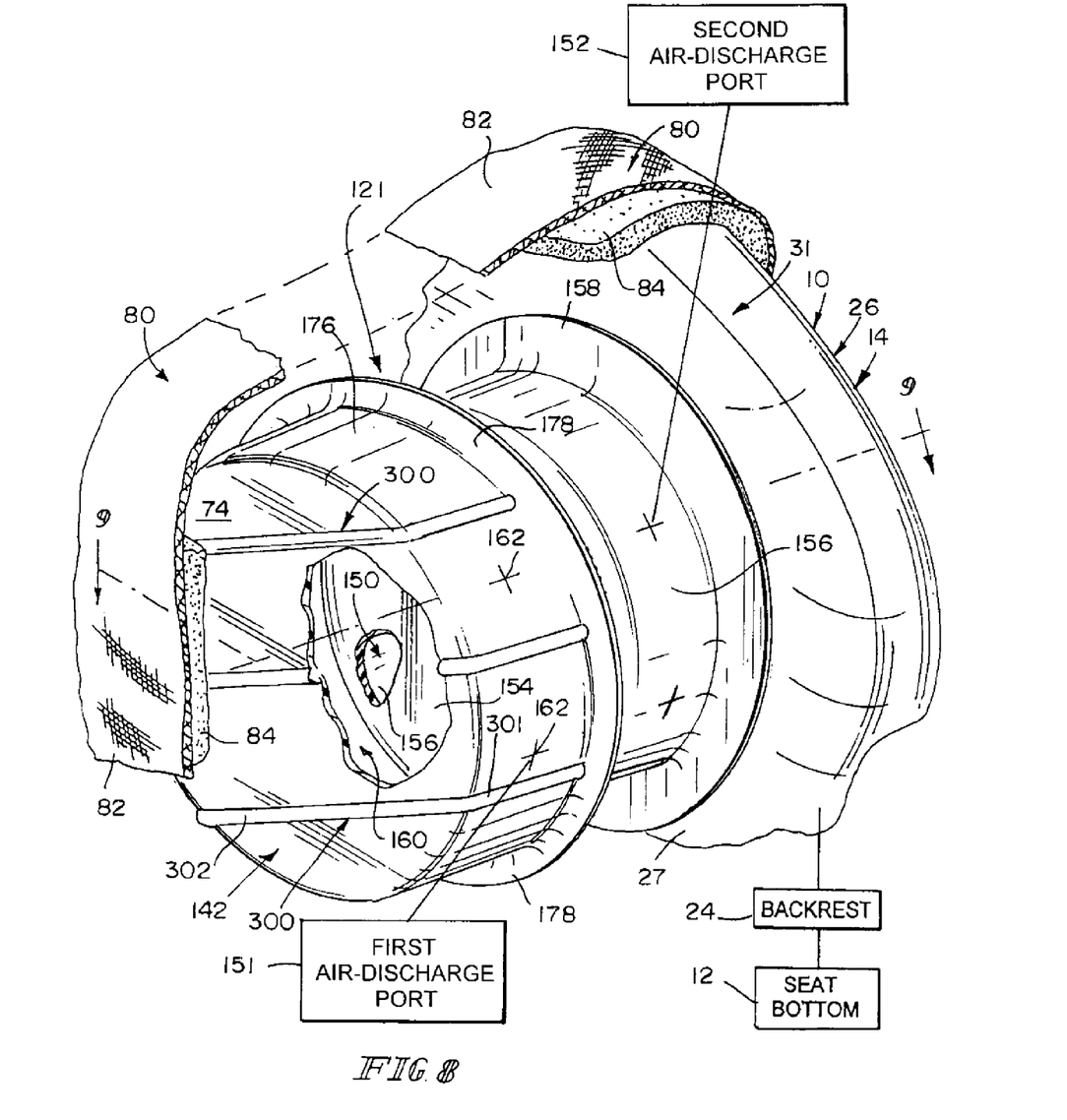
FIG. 8 is an exploded perspective assembly view of the right-side ride-down pad of FIG. 6 showing that the ride-down pad is a multi-stage unit comprising (1) an outer shell configured to include a series of spaced-apart external shape-memory ribs and formed to include an interior region and forwardly facing first and second air-discharge ports (e.g., cross-shaped slits) opening into the interior region of the outer shell and (2) an inner shell formed to include an interior region and forwardly facing first and second air-discharge ports (e.g., cross-shaped slits) opening into the interior region of the inner shell.
Figure 9A:
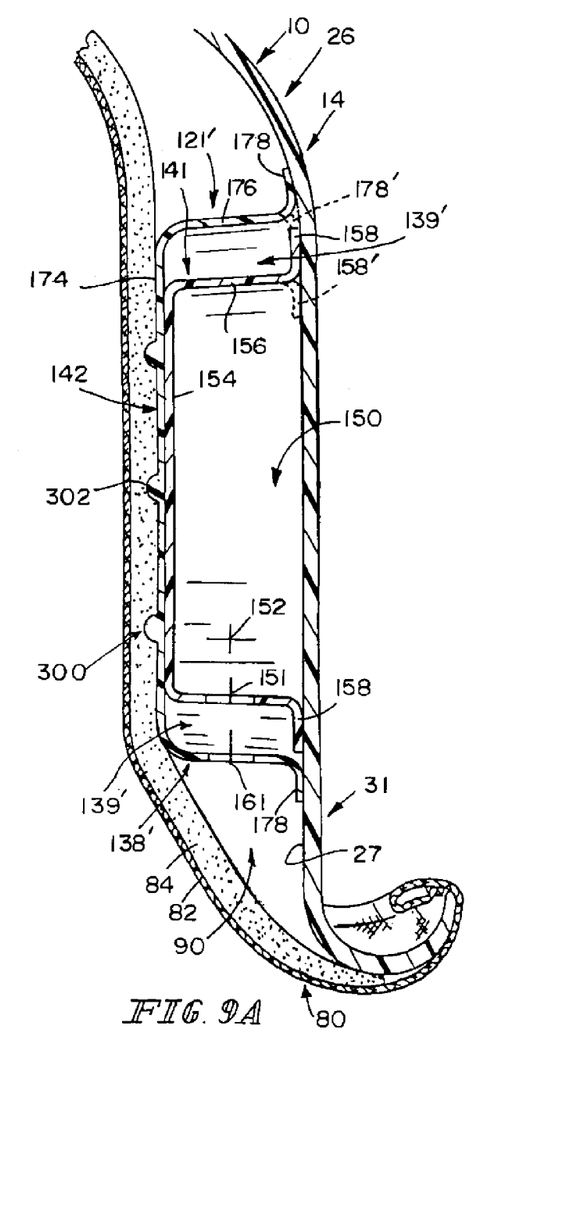
FIG. 9A is a sectional view similar to FIG. 9 of another illustrative embodiment wherein each of the outer and inner shells is mounted on the juvenile vehicle seat to form the right-side ride-down pad.
Figure 10:
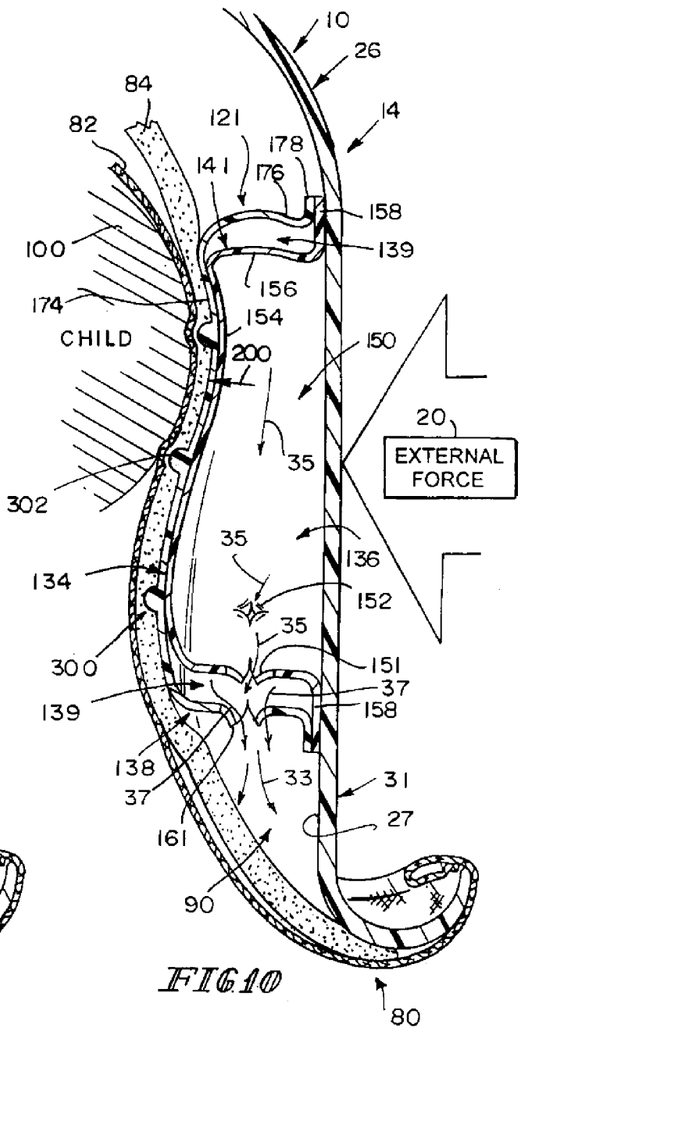

Inner shell 141 is formed to include an interior region 150 and normally closed first and second air-discharge ports 151, 152 (e.g., cross-shaped slits) opening into interior region 150 as suggested in FIGS. 8-10. In an illustrative embodiment, inner shell 141 includes a top wall 154 and a side wall 156 coupled to a perimeter edge of top wall 154 to form interior region 150. Side wall 156 has an annular shape and is formed to include first and second air-discharge ports 151, 152. Top wall 154 has a round shape in an illustrative embodiment and cooperates with annular side wall 156 to provide a bowl-shaped inner shell 141. In an illustrative embodiment, side wall 156 of inner shell 141 includes an outturned annular brim 158 that is adapted to mate with juvenile vehicle seat 10 when inner shell 141 is mounted on juvenile vehicle seat 10.

Outer shell 142 is formed to include an interior region 160 and normally closed first and second air-discharge ports 161, 162 (e.g., cross-shaped slits) opening into interior region 160 as suggested in FIGS. 8-10. In an illustrative embodiment, outer shell 142 includes a top wall 174 and a side wall 176 coupled to a perimeter edge of top wall 174 to form interior region 160. Side wall 176 has an annular shape and is formed to include ports 161, 162. Top wall 174 has a round shape in an illustrative embodiment and cooperates with annular side wall 176 to provide a bowl-shaped outer shell 142. In an illustrative embodiment, side wall 176 of outer shell 142 includes an outturned annular brim 178 that is adapted to lie in spaced-apart relation to juvenile vehicle seat 10 to trap annular brim 158 of inner shell 141 therebetween when outer shell 142 is associated with companion inner shell 141 to form right-side ride-down pad 121 as suggested in FIGS. 9 and 10.

As suggested in FIG. 9, each of first and second air-discharge ports 161, 162 lies at a distance D1 from inner wall 27 of juvenile vehicle seat 10 when outer shell 142 is associated with companion inner shell 141 to establish right-side ride-down pad 121. As also suggested in FIG. 9, each of first and second air-discharge ports 151, 152 formed in inner shell 141 lies at a distance D1 from inner wall 27 of juvenile vehicle seat 10 when outer shell 142 is associated with companion inner shell 141 to establish right-side ride-down pad 121.

As suggested in FIG. 9, inner shell 141 is coupled to juvenile vehicle seat 10 to form a first air bag 134 having a first air chamber 136. Air 35 extant in first air chamber 136 is exposed to first and second air-discharge ports 151, 152 formed in inner shell 141 as suggested in FIGS. 9 and 10. In an illustrative embodiment, annular brim 158 is mated with an inner wall 27 of juvenile vehicle seat 10 to establish a fluid-tight seal therebetween as suggested in FIG. 9. In the illustrated embodiment, inner wall 27 is included in first side-wing panel 31 of headrest 26 of seat back 12 of juvenile vehicle seat 10 as suggested in FIGS. 6 and 9.

As also suggested in FIG. 9, outer shell 142 is coupled to inner shell 141 to form a second air bag 138 having a second air chamber 139. Top wall 154 of inner shell 141 is coupled to top wall 174 of outer shell 142 as suggested in FIGS. 9 and 10. Second air chamber 139 is bounded at least in part by outer and inner shells 142, 141 and arranged to expose air 37 extant in second air chamber 139 to first and second air-discharge ports 161, 162 formed in outer shell 142 as suggested in FIGS. 9 and 10. In an illustrative embodiment, annular brim 178 of outer shell 142 is mated to annular brim 158 of inner shell 141 to establish a fluid-tight seal therebetween as suggested in FIG. 9. It is within the scope of the present disclosure to turn both of mating brims 158, 178 inwardly to lie in interior region 150 and cause annular brim 178 to mate with inner wall 27 of juvenile vehicle seat 10.

In an alternate embodiment, annular brim 178 of outer shell 142 is arranged to surround annular brim 158 of inner shell 141 and is mated with inner wall 27 of juvenile vehicle seat 10 to establish a fluid-tight seal therebetween as suggested in FIG. 9A. This creates a second air bag 138' having a second air chamber 139' as suggested in FIG. 9A. In this alternate embodiment, inner and outer shells 141, 142 cooperate to form a first ride-down pad 121' as suggested in FIG. 9A. In the illustrated embodiment, annular brim 158 is arranged to lie outside of and extend away from interior region 150. It is within the scope of the present disclosure to provide an in-turned annular brim 58' located in interior region 150 as suggested in phantom in FIG. 9A. In the illustrated embodiment, annular brim 178 is arranged to lie outside of and extend away from interior region 160. It is within the scope of the present disclosure to provide an in-turned annular brim 178' located in interior region 160 as suggested in phantom in FIG. 9A.

As suggested in FIG. 9, first and second air chambers 136, 139 are filled with air to allow each of inner and outer shells 141, 142 normally to assume a predetermined inflated shape. In an illustrative embodiment, each of inner and outer shells 141, 142 is made of a deformable elastic material to assume the predetermined inflated shapes shown in FIGS. 6-9. Alternate predetermined inflated shapes are shown in FIG. 9A.

As suggested in FIG. 10, each of first and second air-discharge ports 151, 152 formed in inner shell 141 is formed to include means for discharging air 35 from first air chamber 136 into second air chamber 139 at a metered rate when inner shell 141 is exposed to an external impact force associated with external impact force 20 to cause inner shell 141 to change from the predetermined inflated shape shown, for example, in FIG. 9 to a deflated shape shown, for example, in FIG. 10. As suggested in FIGS. 9 and 10, side wall 176 of outer shell 42 is arranged to surround and lie in spaced-apart relation to side wall 156 of inner shell 141. Once discharged to surroundings 90, air 35 merges with air 37 to form discharged air 33 as suggested in FIG. 5.

As suggested in FIGS. 9 and 10, top walls 154, 174 of inner and outer shells 141, 142 are arranged to mate with one another and side walls 156, 176 are arranged to lie in spaced-apart relation to define second air chamber 139 therebetween. In an illustrative embodiment, each of side walls 156, 176 has annular shape and side walls 156, 176 are arranged to lie in concentric relation to one another to provide second air chamber 139 with an annular shape. Adhesive or other suitable means is used to couple top wall 154 of inner shell 141 to top wall 176 of outer shell 142.

As suggested in FIGS. 7-10, top wall 174 of outer shell 142 includes an interior surface mating with top wall 154 of inner shell 141 and an exterior surface facing away from top wall 154 of inner shell 141. Side wall 176 of outer shell 142 includes an interior surface facing into second air chamber 139 and an exterior surface facing away from second air chamber 139.

As suggested in FIGS. 7-10, outer shell 142 further includes exterior shape-memory ribs 300 coupled to the exterior surfaces of side wall 174 and top wall 176. Exterior shape-memory ribs 300 are configured to establish shape-recovery means for changing the shape of outer shell 142 from a deflated shape shown, for example, in FIG. 10 to a predetermined inflated shape shown, for example, in FIG. 9 once outer shell 142 is no longer exposed to external impact force 20. In the illustrated embodiment, exterior shape-memory ribs 300 are arranged to lie in spaced-apart relation to one another as shown in FIG. 7. Each rib 300 is continuous and includes a straight first segment 301 located on side wall 174, a straight third segment 303 located on side wall 174 and arranged to lie in spaced-apart relation to straight first segment 301, and a straight second segment 302 located on top wall 176 and arranged to interconnect first and third segments 301, 303. It is within the scope of this disclosure to provide a discontinuous exterior shape-memory rib and to provide segments in rib 300 with non-straight shapes.

In an illustrative embodiment, an outer cover 80 is coupled to headrest 26 and arranged to cover each of right-side and left-side ride-down pads 121, 122. Outer cover 80 functions to dissipate energy associated with external impact forces 20 and to protect ride-down pads 121, 122 from damage. In an illustrative embodiment, outer cover 80 includes an outer skin 82 and a cushion 84 under outer skin 82 as shown, for example, in FIGS. 8-10.

The invention claimed is:

1. A child restraint comprising
a juvenile vehicle seat and
an energy-dissipation system coupled to the juvenile vehicle seat, the energy-dissipation system including a first ride-down pad including an inner shell formed to include an interior region and a normally closed first air-discharge port opening into the interior region of the inner shell and an outer shell formed to include an interior region and a normally closed first air-discharge port opening into the interior region of the outer shell, wherein the inner shell is coupled to the juvenile vehicle seat to form a first air bag having a first air chamber to expose air extant in the first air chamber to the first air-discharge port formed in the inner shell, the outer shell is arranged to cooperate with the inner shell to form a second air bag having a second air chamber bounded at least in part by the outer and inner shells and arranged to expose air extant in the second air chamber to the first air-discharge port formed in the outer shell, the first and second air chambers are filled with air to allow each of the outer and inner shells normally to assume a predetermined inflated shape, the first air-discharge port formed in the inner shell is formed to include means for discharging air from the first air chamber into the second air chamber at a metered rate when the inner shell is exposed to an external impact force to change from the predetermined inflated shape to a deflated shape, and the first air-discharge port formed in the outer shell is formed to include means for discharging air from the second air chamber to surroundings outside the outer shell at a metered rate when the outer shell is exposed to an external impact force to change from the predetermined inflated shape to a deflated shape so that the first ride-down pad absorbs external energy associated with the external impact forces to minimize g-loads experienced by a child seated in the juvenile vehicle seat.

2. The child restraint of claim 1, wherein the outer shell is made of a deformable elastic material normally to assume the predetermined inflated shape and the deformable elastic material is configured to establish elastic means for changing the shape of the outer shell from the deflated shape to the predetermined inflated shape once the outer shell is no longer exposed to the external impact force.

3. The child restraint of claim 2, wherein the inner shell is made of a deformable elastic material normally to assume the predetermined inflated shape and the deformable elastic material is configured to establish elastic means for changing the shape of the inner shell from the deflated shape to the predetermined inflated shape once the inner shell is no longer exposed to the external impact force.

4. The child restraint of claim 1, wherein the inner shell is made of a deformable elastic material normally to assume the predetermined inflated shape and the deformable elastic material is configured to establish elastic means for changing the shape of the inner shell from the deflated shape to the predetermined inflated shape once the inner shell is no longer exposed to the external impact force.

5. The child restraint of claim 1, wherein the inner shell includes a top wall and a side wall coupled to the top wall to form the interior region of the inner shell and the side wall is formed to include the first air-discharge port formed in the inner shell and the side wall of the inner shell is located in the interior region of the outer shell.

6. The child restraint of claim 5, wherein the outer shell includes a top wall and a side wall coupled to the top wall to form the interior region of the outer shell and the side wall is formed to include the first air-discharge port formed in the outer shell.

7. The child restraint of claim 6, wherein the top walls of the outer and inner shells are arranged to lie in spaced-apart relation to one another when the outer and inner shells assume their predetermined inflated shapes to form at least a portion of the second air chamber therebetween.

8. The child restraint of claim 6, wherein the side wall of the outer shell includes an upper portion coupled to the top wall of the outer shell and formed to include the first air-discharge port and a lower portion arranged to extend from the upper portion toward the juvenile vehicle seat and to surround the side wall of the inner shell.

9. The child restraint of claim 8, wherein the lower portion of the side wall of the outer shell is formed to include a first air-transfer passageway arranged to cooperate with the first air-discharge port formed in the side wall of the inner shell and a portion of the second air chamber to form air-exhaust means for conducting air discharged from the first air chamber to surroundings outside of the first ride-down pad.

10. The child restraint of claim 9, wherein the lower portion of the side wall of the outer shell is arranged to mate with the side wall of the inner shell to align the first air-transfer passageway formed in the outer shell in closely confronting relation to the first air-discharge port formed in the inner shell.

11. The child restraint of claim 9, wherein each of the side walls of the outer and inner shells has an annular shape and the lower portion of the side wall of the outer shell is arranged to surround and lie in spaced-apart relation to the side wall of the inner shell to define an annular space lying therebetween and comprising a portion of the second air chamber included in the air-exhaust means.

12. The child restraint of claim 9, wherein the side wall of the inner shell includes an annular brim arranged to mate with the juvenile vehicle seat and the lower portion of the side wall of the outer shell includes an annular brim arranged to surround the annular brim of the inner shell and mate with the juvenile vehicle seat.

13. The child restraint of claim 8, wherein the side wall of the inner shell includes an annular brim arranged to mate with the juvenile vehicle seat and to extend away from the second air chamber and the lower portion of the side wall of the outer shell includes an annular brim arranged to extend away from the second air chamber and to mate with the annular brim of the inner shell and lie in spaced-apart relation to the juvenile vehicle seat to trap the annular brim of the inner shell therebetween.

14. The child restraint of claim 13, wherein the lower portion of the side wall of the outer shell is arranged to mate with the side wall of the inner shell to align the first air-transfer passageway formed in the outer shell in closely confronting relation to the first air-discharge port formed in the inner shell.

15. The child restraint of claim 6, wherein the top walls of the outer and inner shells are arranged to mate with one another and the side walls of the outer and inner shells are arranged to lie in spaced-apart relation to one another to define the second air chamber therebetween.

16. The child restraint of claim 15, wherein the top wall of the outer shell includes an interior surface mating with the top wall of the inner shell and an exterior surface and the outer shell further includes exterior shape-memory ribs coupled to the exterior surface and coupled to the side wall of the outer shell and configured to establish shape-recovery means for changing the shape of the outer shell from the deflated shape to the predetermined inflated shape once the outer shell is no longer exposed to the external impact force.

17. The child restraint of claim 15, wherein the side wall of the inner shell includes an annular brim arranged to mate with the juvenile vehicle seat and the lower portion of the side wall of the outer shell includes an annular brim arranged to surround the annular brim of the inner shell and mate with the juvenile vehicle seat.

18. The child restraint of claim 17, wherein the annular brim of the side wall of the inner shell is arranged to lie in spaced-apart relation to a portion of the top wall of the outer shell to locate the second air chamber therebetween.

19. The child restraint of claim 1, wherein the outer shell includes a side wall arranged to surround the inner shell and the first air-discharge port formed in the inner shell is arranged to open toward the side wall of the outer shell.

20. The child restraint of claim 19, wherein the inner shell includes a side wall located in the interior region of the outer shell and formed to include the first air-discharge port, each of the side walls of the outer and inner shells is endless, and the side walls are arranged to lie in spaced-apart relation to one another to define the second air chamber therebetween.

21. The child restraint of claim 19, wherein the inner shell includes an annular brim arranged to mate with the juvenile vehicle seat and the side wall of the outer shell includes an annular brim arranged to mate with the annular brim of the inner shell and lie in spaced-apart relation to the juvenile vehicle seat to trap the annular brim of the inner shell therebetween.

22. The child restraint of claim 19, wherein the inner shell includes an annular brim arranged to mate with the juvenile vehicle seat and the side wall of the outer shell includes an annular brim arranged to surround the annular brim of the inner shell and mate with the juvenile vehicle seat.

23. The child restraint of claim 19, wherein the side wall of the outer shell is formed to include a first air-transfer passageway arranged to cooperate with the first air-discharge port formed in a side wall of the inner shell and a portion of the second air chamber to form air-exhaust means for conducting air discharged from the first air chamber to surroundings outside the first ride-down pad.

24. The child restraint of claim 23, wherein the side wall of the outer shell is arranged to mate with the side wall of the inner shell to align the first air-transfer passageway in closely confronting relation to the first air-discharge port formed in the inner shell.

25. The child restraint of claim 23, wherein the inner shell includes a side wall located in the interior region of the outer shell and formed to include the first air-discharge port, each of the side walls of the outer and inner shells is endless, and the side walls are arranged to lie in spaced-apart relation to one another to define a portion of the second air chamber therebetween.

26. A child restraint comprising
a juvenile vehicle seat and
an energy-dissipation system coupled to the juvenile vehicle seat, the energy-dissipation system including a first ride-down pad including an outer shell formed to include an interior region and an inner shell arranged to extend into the interior region of the outer shell, wherein the inner shell is coupled to the juvenile vehicle seat to define a first air chamber therebetween and formed to include a normally closed first air-discharge port opening into the first air chamber, the outer shell is associated with the inner shell to form a second air chamber therebetween and formed to include a normally closed first air-discharge port opening into the second air chamber, and each of the outer and inner shells is made of a deformable elastic material and is configured to deform in response to application of an external impact force to the juvenile vehicle seat to cause air extant in the first air chamber to exit through the normally closed first air-discharge port formed in the inner shell and air extant in the second air chamber to exit through the normally closed first air-discharge port formed in the outer shell.

* * * * *